United States Patent
Li et al.

(10) Patent No.: US 12,436,369 B2
(45) Date of Patent: Oct. 7, 2025

(54) OPTICAL TEST SYSTEM

(71) Applicant: Zhejiang Sunny Optics Co., Ltd., Yuyao (CN)

(72) Inventors: Yang Li, Yuyao (CN); Bin Liu, Yuyao (CN); Lingbo He, Yuyao (CN); Lin Huang, Yuyao (CN); Fujian Dai, Yuyao (CN); Liefeng Zhao, Yuyao (CN)

(73) Assignee: ZHEJIANG SUNNY OPTICS CO., LTD., Yuyao (CN)

( * ) Notice: Subject to any disclaimer, the term of this patent is extended or adjusted under 35 U.S.C. 154(b) by 574 days.

(21) Appl. No.: 17/575,210

(22) Filed: Jan. 13, 2022

(65) Prior Publication Data

US 2022/0236525 A1    Jul. 28, 2022

(30) Foreign Application Priority Data

Jan. 27, 2021 (CN) .......................... 202110110283.5

(51) Int. Cl.
*G02B 13/00* (2006.01)
*G02B 9/34* (2006.01)
*G02B 27/00* (2006.01)

(52) U.S. Cl.
CPC ............. *G02B 13/004* (2013.01); *G02B 9/34* (2013.01); *G02B 27/0025* (2013.01)

(58) Field of Classification Search
CPC .... G02B 13/004; G02B 9/34; G02B 27/0025; G02B 13/18; G02B 13/24; G01M 11/00
See application file for complete search history.

(56) References Cited

U.S. PATENT DOCUMENTS 8,773,771 B2 *   7/2014   Abe ..................... G02B 13/004
                                                       359/773
8,879,172 B2 *  11/2014   Kubota ................... G02B 9/34
                                                       359/773
(Continued)

FOREIGN PATENT DOCUMENTS

CN        107238911 A      10/2017
CN        111708147 A       9/2020
(Continued)

OTHER PUBLICATIONS

English translation of Chinese Office Action corresponding to application CN202110110283.5, dated Jul. 6, 2023, 15 pages.

*Primary Examiner* — Bumsuk Won
*Assistant Examiner* — John Curtis Sipes
(74) *Attorney, Agent, or Firm* — Reising Ethington P.C.

(57) ABSTRACT

An optical test system is provided, comprising, sequentially along an optical axis, a distance extension module and an optical lens assembly. The distance extension module comprises one or more lenses. The optical lens assembly comprises, sequentially along the optical axis from an object side to an image side: a diaphragm; a first lens, having a positive refractive power, an object-side surface of the first lens being a convex surface, and an image-side surface of the first lens being a convex surface; a second lens, having a negative refractive power, an object-side surface of the second lens being a concave surface, and an image-side surface of the second lens being a concave surface; a third lens, having a refractive power, an object-side surface of the third lens being a concave surface, and an image-side surface of the third lens being a convex surface; and a fourth lens, having a refractive power.

8 Claims, 9 Drawing Sheets

(56) References Cited

U.S. PATENT DOCUMENTS

| | | | | |
|---|---|---|---|---|
| 2010/0254001 A1* | 10/2010 | Jang | ................... | G02B 30/56 |
| | | | | 359/743 |
| 2013/0250440 A1* | 9/2013 | Ota | ................... | G02B 13/004 |
| | | | | 359/715 |
| 2014/0192423 A1* | 7/2014 | Kondo | ............... | G02B 13/0045 |
| | | | | 359/714 |
| 2014/0198397 A1* | 7/2014 | Sekine | ............... | G02B 13/004 |
| | | | | 359/715 |
| 2014/0347515 A1* | 11/2014 | Iba | ................... | G03B 17/565 |
| | | | | 348/222.1 |
| 2015/0043092 A1* | 2/2015 | Suzuki | ................ | G02B 9/34 |
| | | | | 359/773 |
| 2015/0124149 A1* | 5/2015 | Tang | ................. | G02B 13/004 |
| | | | | 348/335 |
| 2019/0391372 A1* | 12/2019 | Haverkamp | ............ | G02B 9/60 |

FOREIGN PATENT DOCUMENTS

| | | |
|---|---|---|
| CN | 211554452 U | 9/2020 |
| CN | 111830685 A | 10/2020 |
| CN | 213934372 U | 8/2021 |

\* cited by examiner

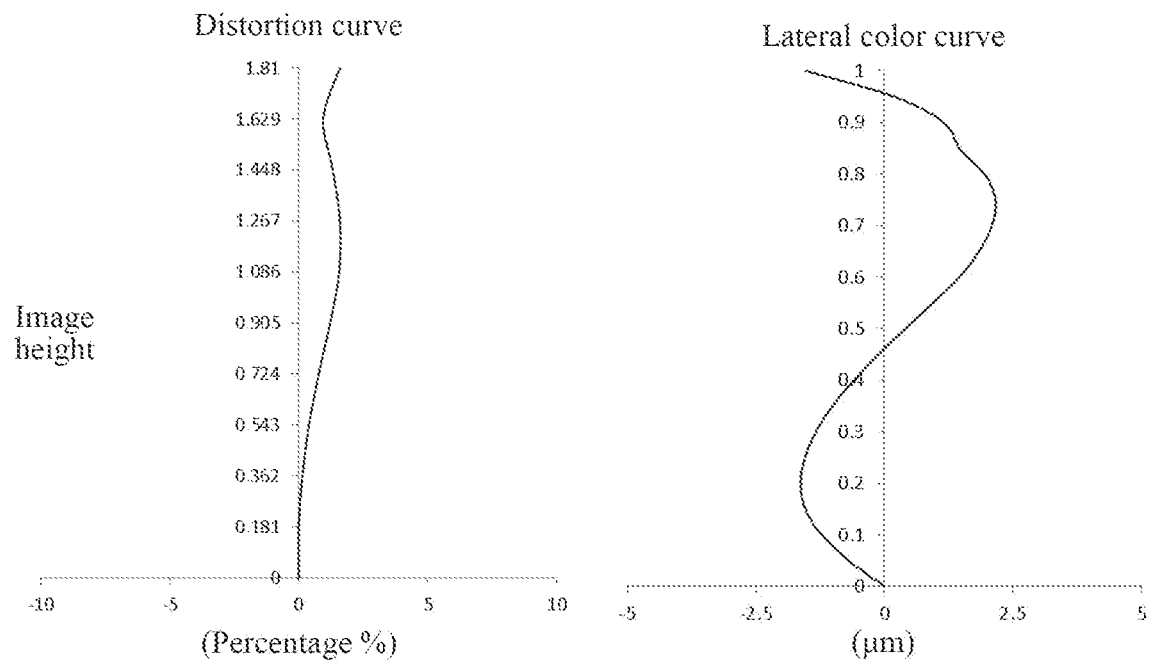
Fig. 2C
Fig. 2D
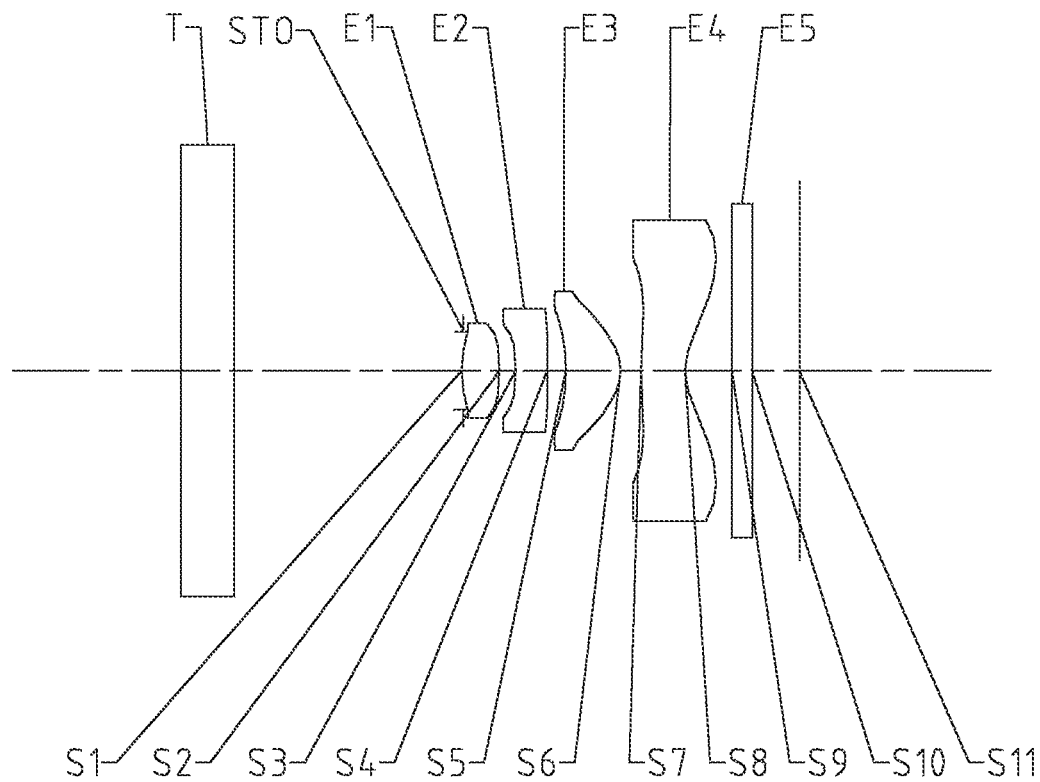
Fig. 3

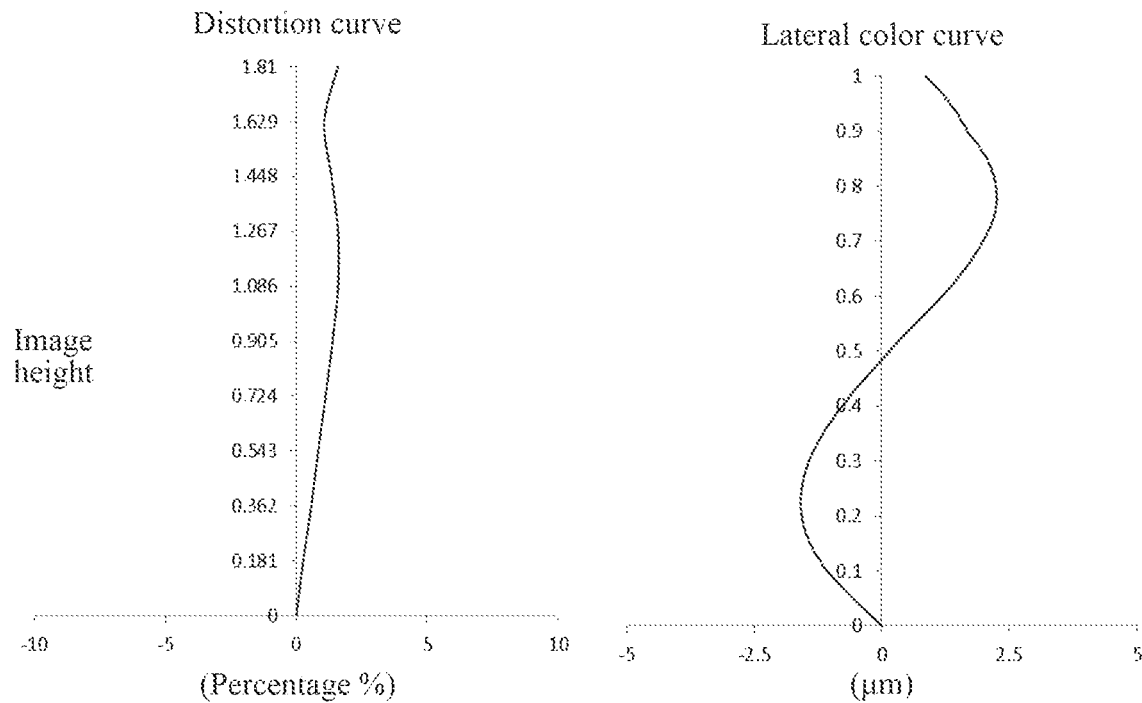
Fig. 10C
Fig. 10D
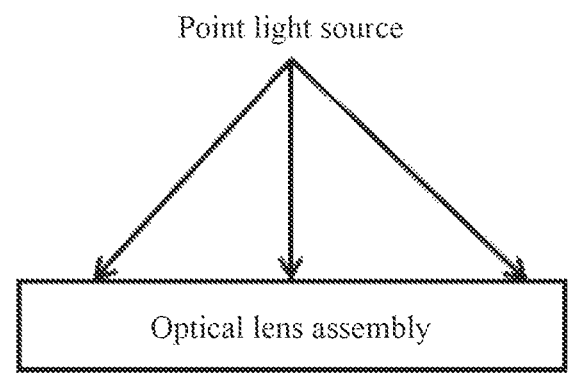
Fig. 11

US 12,436,369 B2

OPTICAL TEST SYSTEM

CROSS-REFERENCE TO RELATED APPLICATIONS

This application claims the priority from Chinese Patent Application No. 202110110283.5, filed in the National Intellectual Property Administration (CNIPA) on Jan. 27, 2021, the content of which is hereby incorporated by reference in its entirety.

TECHNICAL FIELD

The present disclosure relates to the field of optical element, and specifically to an optical test system comprising a distance extension module and an optical lens assembly.

BACKGROUND

Hand-held smart terminals such as a smartphone and a tablet computer have been widely used. These hand-held smart terminals are equipped with a high-pixel camera, and thus can meet the photography needs of most users. In addition, people have also developed a lens assembly that has specific photographic effects and can be installed on the handheld smart terminals, for example, a macro lens assembly, thereby further enriching the photography functions of the handheld smart terminals.

The macro lens assembly, as a special macro photography lens assembly, is mainly used to photograph a very subtle object and implement a magnification for details of a photographed object. The close-up of the macro lens assembly is not dependent on an external close-up accessory. All close-up operations are performed in the lens assembly itself. The lens assembly can focus continuously from close-up to infinity, and thus can be adjusted from a close-up state to a normal photography state, which provides convenience for a photographer to perform an alternation between the close-up photography and the normal photography.

SUMMARY

The present disclosure provides an optical test system, comprising, sequentially along an optical axis: a distance extension module, comprising one or more lenses; and an optical lens assembly, comprising, sequentially along the optical axis from an object side to an image side: a diaphragm; a first lens, having a positive refractive power, an object-side surface of the first lens being a convex surface, and an image-side surface of the first lens being a convex surface; a second lens, having a negative refractive power, an object-side surface of the second lens being a concave surface, and an image-side surface of the second lens being a concave surface; a third lens, having a refractive power, an object-side surface of the third lens being a concave surface, and an image-side surface of the third lens being a convex surface; and a fourth lens, having a refractive power.

In an implementation, $-2.0<f4/f<-0.5$, wherein f4 is an effective focal length of the fourth lens, and f is a total effective focal length of the optical lens assembly.

In an implementation, $-7.5<R2/R1<-2.5$, wherein R1 is a radius of curvature of the object-side surface of the first lens, and R2 is a radius of curvature of the image-side surface of the first lens.

In an implementation, $-4.5<f2/f3<-2.5$, wherein f2 is an effective focal length of the second lens, and f3 is an effective focal length of the third lens.

In an implementation, $3.0<f1/CT1<4.0$, wherein f1 is an effective focal length of the first lens, and CT1 is a center thickness of the first lens along the optical axis.

In an implementation, $1.5<R4/|R5+R6|<3.0$, wherein R4 is a radius of curvature of the image-side surface of the second lens, R5 is a radius of curvature of the object-side surface of the third lens, and R6 is a radius of curvature of the image-side surface of the third lens.

In an implementation, $1.0<T23/T12<2.1$, wherein T12 is a spacing distance between the first lens and the second lens along the optical axis, and T23 is a spacing distance between the second lens and the third lens along the optical axis.

In an implementation, $1.0<TL/TTL<1.5$, wherein TL is a spacing distance between an image-side surface of the distance extension module and the diaphragm along the optical axis, and TTL is a distance from the object-side surface of the first lens to an image surface of the optical lens assembly along the optical axis.

In an implementation, $2.0<f/R8<3.2$, wherein f is the total effective focal length of the optical lens assembly, and R8 is a radius of curvature of an image-side surface of the fourth lens.

In an implementation, $3.0<\Sigma CT/CT3<4.0$, wherein CT3 is a center thickness of the third lens along the optical axis, and $\Sigma CT$ is a sum of respective center thicknesses of the first lens to the fourth lens along the optical axis.

According to the present disclosure, by disposing the distance extension module, a simulated point light source applicable to a macro lens assembly may be formed by using parallel light, thereby implementing a performance test on the macro lens assembly.

BRIEF DESCRIPTION OF THE DRAWINGS

In combination with the accompanying drawings, other features, objectives and advantages of the present disclosure will become more apparent through the following detailed description for non-limiting embodiments. In the accompanying drawings:

FIGS. 2A-2D respectively show a longitudinal aberration curve, an astigmatic curve, a distortion curve and a lateral color curve of the optical lens assembly in Embodiment 1;

FIG. 3 is a schematic structural diagram of an optical test system according to Embodiment 2 of the present disclosure;

FIGS. 10A-10D respectively show a longitudinal aberration curve, an astigmatic curve, a distortion curve and a lateral color curve of the optical lens assembly in Embodiment 5;

FIG. 11 schematically shows a required point light source used in a test for an optical lens assembly.

DETAILED DESCRIPTION OF EMBODIMENTS

Figure 1:
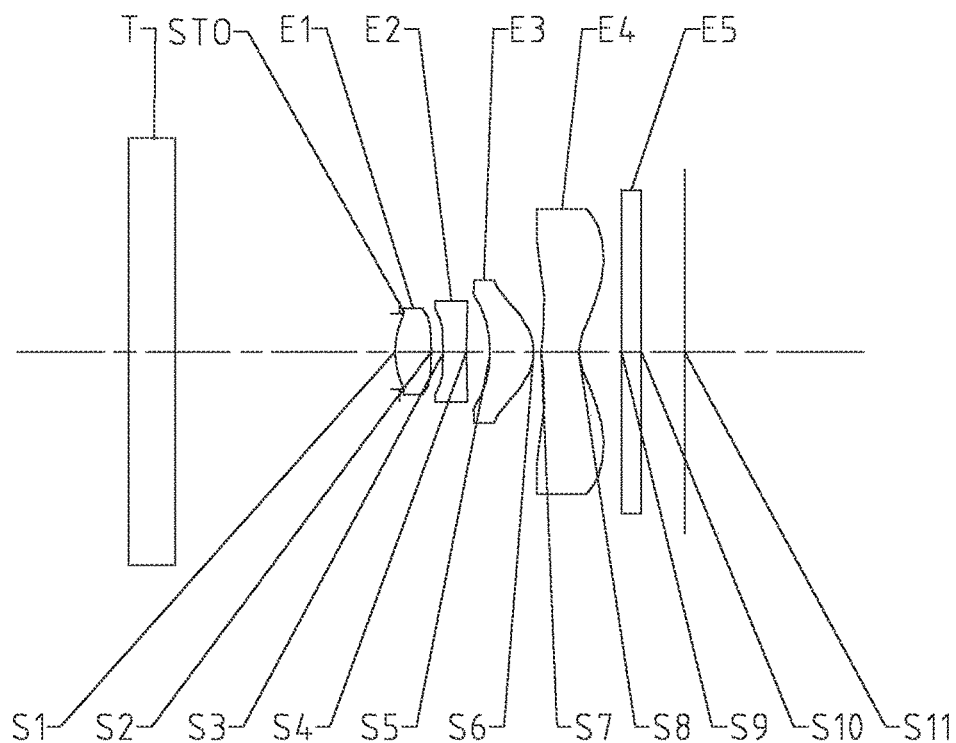
FIG. 1 is a schematic structural diagram of an optical test system according to Embodiment 1 of the present disclosure.

For a better understanding of the present disclosure, various aspects of the present disclosure will be described in more detail with reference to the accompanying drawings. It should be understood that the detailed description is merely an illustration for the exemplary implementations of the present disclosure, rather than a limitation to the scope of the present disclosure in any way. Throughout the specification, the same reference numerals designate the same elements. The expression "and/or" includes any and all combinations of one or more of the associated listed items.

It should be noted that, in the specification, the expressions such as "first", "second" and "third" are only used to distinguish one feature from another, rather than represent any limitations to the features. Thus, the first lens discussed below may also be referred to as the second lens or the third lens without departing from the teachings of the present disclosure.

In the accompanying drawings, the thicknesses, sizes and shapes of the lenses are slightly exaggerated for the convenience of explanation. Specifically, shapes of spherical surfaces or aspheric surfaces shown in the accompanying drawings are shown by examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, a paraxial area refers to an area near an optical axis. If a lens surface is a convex surface and the position of the convex surface is not defined, it represents that the lens surface is a convex surface at least at the paraxial area. If the lens surface is a concave surface and the position of the concave surface is not defined, it represents that the lens surface is a concave surface at least at the paraxial area. A surface of each lens that is closest to a photographed object is referred to as the object-side surface of the lens, and a surface of the each lens that is closest to an image side is referred to as the image-side surface of the lens.

It should be further understood that the terms "comprise," "comprising," "having," "include" and/or "including," when used in the specification, specify the presence of stated features, elements and/or components, but do not exclude the presence or addition of one or more other features, elements, components and/or combinations thereof. In addition, expressions such as "at least one of," when preceding a list of listed features, modify the entire list of features rather than an individual element in the list. Further, the use of "may," when describing the implementations of the present disclosure, relates to "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms (i.e., those defined in commonly used dictionaries) should be interpreted as having a meaning that is consistent with their meaning in the context of the relevant art and will not be interpreted in an idealized or overly formal sense unless expressly so defined herein.

It should be noted that the embodiments in the present disclosure and the features in the embodiments may be combined with each other on a non-conflict basis. The present disclosure will be described below in detail with reference to the accompanying drawings and in combination with the embodiments.

Features, principles and other aspects of the present disclosure are described below in detail.

An optical test system according to exemplary implementations of the present disclosure may include a distance extension module and an optical lens assembly. The distance extension module may include one or more lenses. The distance extension module may converge parallel light to form a point light source used to simulate an object of the optical lens assembly, thereby implementing a performance test for a rear optical lens assembly (e.g., a macro lens assembly). The optical lens assembly may include four lenses having refractive powers, which are respectively a first lens, a second lens, a third lens and a fourth lens. The first to fourth lenses are arranged in sequence along an optical axis from an object side (i.e., a side close to the distance extension module) to an image side. Any two adjacent lenses in the first to fourth lenses may have a spacing distance.

Figure 12:
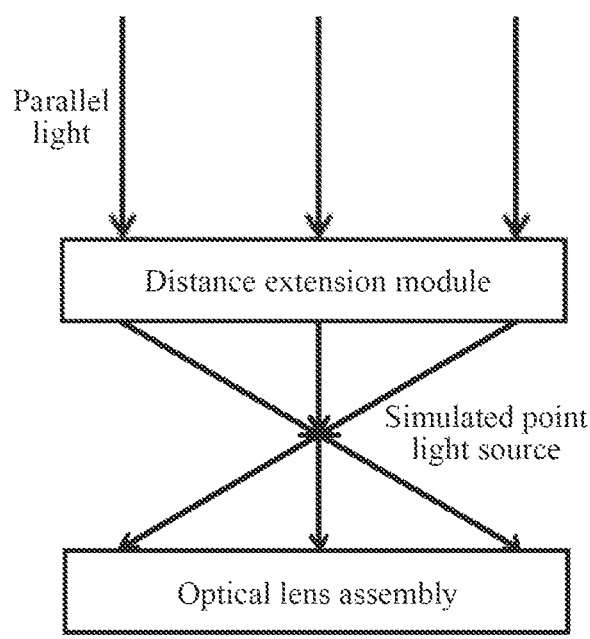
FIG. 12 is a schematic diagram of a simulation performed for the required point light source used in the test for the optical lens assembly by using a distance extension module.

FIG. 11 schematically shows a required point light source used in a test for an optical lens assembly, and FIG. 12 is a schematic diagram of a simulation performed for the required point light source used in the test for the optical lens assembly by using a distance extension module.

The optical lens assembly in the optical test system may be a macro lens assembly, which may have a quite small object distance, for example, a few millimeters to several tens of millimeters. When a test is performed on the optical performance of the macro lens assembly, a point light source needs to be disposed at the object side of the macro lens assembly. However, the object distance of the macro lens assembly is too small and the performance of the macro lens assembly is sensitive to the object distance. Accordingly, if a physical point light source is directly disposed at the object side of the macro lens assembly, it is possible that the test on the performance of the macro lens assembly cannot be implemented.

According to the present disclosure, the distance extension module is disposed in front of the optical lens assembly, and the distance extension module is used to simulate the point light source of the optical lens assembly. The distance extension module disposed in front of the optical lens assembly needs to be confocal with the optical lens assembly, such that the simulated point light source formed by the distance extension module can be used as the photographed object of the macro lens assembly, to implement the test on the performance of the macro lens assembly. The distance extension module may convert the parallel light, such that the test on the performance of the macro lens assembly can be performed by using the parallel light, solving a problem caused by the direct use of the point light source, for example, a problem that the test cannot be performed because the point light source and the lens are disposed too close.

In some implementations, the distance extension module has an adjustable thickness. For example, the total thickness of the distance extension module may be changed by increasing or decreasing a number of lenses.

The optical lens assembly may be a macro lens assembly used to implement close-up shooting. The distance extension module disposed in front of the macro lens assembly may form the simulated point light source applicable to the macro lens assembly, thereby implementing the performance test on the macro lens assembly.

In the exemplary implementations, the first lens may have a positive refractive power. The second lens may have a negative refractive power, an object-side surface of the second lens is a concave surface, and an image-side surface of the second lens is a concave surface. The third lens may have a refractive power, an object-side surface of the third lens is a concave surface, and an image-side surface of the third lens is a convex surface. The fourth lens may have a refractive power. By reasonably configuring the refractive power of the first lens, the macro characteristics of the lens assembly can be ensured, thereby achieving a large magnification. By reasonably configuring the refractive power and the surface type of the second lens, the off-axis aberration of the optical lens assembly can be effectively corrected, thereby improving an imaging quality. By reasonably configuring the surface type of the third lens, it can be ensured that the third lens has a good processability, and the total track length of the optical lens assembly is further reduced to make the optical lens assembly compact in structure. By reasonably configuring the refractive power of the fourth lens, the tolerance sensitivity of the optical lens assembly can be effectively reduced.

In the exemplary implementations, the optical lens assembly may further include a diaphragm disposed between the object side and the first lens. The diaphragm and the distance extension module have an air spacing, the diaphragm and the first lens also have an air spacing. The diaphragm is disposed to control the number of light beams passing through the first to fourth lenses, to achieve the purpose of adjusting the intensity of the illuminance of the light beam of the optical lens assembly.

In the exemplary implementations, the optical test system according to the present disclosure may satisfy: $-2.0<f4/f<-0.5$. Here, f4 is an effective focal length of the fourth lens and f is a total effective focal length of the optical lens assembly. By satisfying $-2.0<f4/f<-0.5$, it can be ensured that the optical lens assembly has the characteristic of a relatively long focal length, such that the optical lens assembly has a small depth of field and a large magnification. In addition, satisfying $-2.0<f4/f<-0.5$ is conducive to shortening the total track length of the optical lens assembly to ensure the miniaturization of the optical test system. Alternatively, the fourth lens has a negative refractive power.

In the exemplary implementations, the optical test system according to the present disclosure may satisfy: $-7.5<R2/R1<-2.5$. Here, R1 is a radius of curvature of an object-side surface of the first lens, and R2 is a radius of curvature of an image-side surface of the first lens. Satisfying $-7.5<R2/R1<-2.5$ is conducive to the miniaturization of the optical test system. Moreover, by satisfying $-7.5<R2/R1<-2.5$, the resolution of the optical test system is effectively improved. Alternatively, the object-side surface and the image-side surface of the first lens may both be convex surfaces.

In the exemplary implementations, the optical test system according to the present disclosure may satisfy: $-4.5<f2/f3<-2.5$. Here, f2 is an effective focal length of the second lens, and f3 is an effective focal length of the third lens. By satisfying $-4.5<f2/f3<-2.5$, the reasonable distribution of the focal length of the optical lens assembly can be implemented, and thus, various aberrations are effectively corrected to achieve the purpose of improving the resolution of the optical test system.

In the exemplary implementations, the optical test system according to the present disclosure may satisfy: $3.0<f1/CT1<4.0$. Here, f1 is an effective focal length of the first lens, and CT1 is a center thickness of the first lens along the optical axis. By satisfying $3.0<f1/CT1<4.0$, the reasonable distribution of the refractive power of the first lens can be implemented, which is conducive to correcting various aberrations and improving the resolution of the optical test system. For example, f1 and CT1 may satisfy $3.3<f1/CT1<3.8$.

In the exemplary implementations, the optical test system according to the present disclosure may satisfy: $1.5<R4/|R5+R6|<3.0$. Here, R4 is a radius of curvature of the image-side surface of the second lens, R5 is a radius of curvature of the object-side surface of the third lens, and R6 is a radius of curvature of the image-side surface of the third lens. Satisfying $1.5<R4/|R5+R6|<3.0$ is conducive to reducing aberrations and improving the imaging quality of the optical test system.

In the exemplary implementations, the optical test system according to the present disclosure may satisfy: $1.0<T23/T12<2.1$. Here, T12 is a spacing distance between the first lens and the second lens along the optical axis, and T23 is a spacing distance between the second lens and the third lens along the optical axis. Satisfying $1.0<T23/T12<2.1$ is conducive to reasonably distributing the spacing distances between the first lens, the second lens and the third lens, thereby effectively reducing the thickness sensitivity of the optical lens assembly and correcting the field curvature of the optical lens assembly.

In the exemplary implementations, the optical test system according to the present disclosure may satisfy: $1.0<TL/TTL<1.5$. Here, TL is a spacing distance between an image-side surface of the distance extension module and the diaphragm along the optical axis, and TTL is a distance from the object-side surface of the first lens to an image surface of the optical lens assembly along the optical axis. Satisfying $1.0<TL/TTL<1.5$ is conducive to reducing the influence of the aberration of the distance extension module on the test result, improving the imaging quality of the optical lens assembly, and ensuring the miniaturization of the optical test system.

In the exemplary implementations, the optical test system according to the present disclosure may satisfy: $2.0<f/R8<3.2$. Here, f is the total effective focal length of the optical lens system, and R8 is a radius of curvature of an image-side surface of the fourth lens. Satisfying $2.0<f/R8<3.2$ is conducive to eliminating the spherical aberration and improving the imaging quality. Alternatively, the image-side surface of the fourth lens may be a concave surface.

In the exemplary implementations, the optical test system according to the present disclosure may satisfy: $3.0<\Sigma CT/CT3<4.0$. Here, CT3 is a center thickness of the third lens along the optical axis, and $\Sigma CT$ is a sum of respective center thicknesses of the first lens to the fourth lens along the optical axis. Satisfying $3.0<\Sigma CT/CT3<4.0$ is conducive to reasonably distributing the center thickness of the third lens, such that the third lens is easily injection molded, and accordingly, the processability of the entire optical lens assembly is improved and a good imaging quality is ensured at the same time.

In the exemplary implementations, the optical lens assembly according to the present disclosure may further include an optical filter for correcting color deviations and/or a protective glass for protecting a photosensitive element on the image plane.

The optical lens assembly according to the above implementations of the present disclosure may use a plurality of lenses, for example, the above four lenses. By reasonably distributing the refractive powers and the surface types of the lenses, the center thicknesses of the lenses, the axial spacings between the lenses, etc., the optical lens assembly has the characteristics of the macro lens assembly, and thus can meet the needs for close-up shooting, and can implement the magnification for details of the photographed object.

In addition, by reasonably configuring the distance extension module and the optical lens assembly, it is also possible to effectively reduce the size of the optical test system, and improve the processability of the optical test system. In particular, by disposing the distance extension module, the simulated point light source applicable to the macro lens assembly may be formed by using the parallel light, thereby implementing the performance test on the optical lens assembly having the characteristics of the macro lens assembly.

In the implementations of the present disclosure, at least one of the surfaces of the lenses in the optical lens assembly is an aspheric surface. That is, at least one of the surfaces from the object-side surface of the first lens to the image-side surface of the fourth lens is an aspheric surface. The aspheric lens is characterized in that the curvature continuously changes from the center of the lens to the periphery. Different from a spherical lens having a constant curvature from the center of the lens to the periphery, the aspheric lens has a better radius-of-curvature characteristic, and has advantages of improving the distortion aberration (i.e., improving the astigmatic aberration). The use of the aspheric lens can eliminate as much as possible the aberrations that occur during the imaging, thereby improving the imaging quality. Alternatively, at least one of the object-side surface and the image-side surface of each of the first lens, the second lens, the third lens and the fourth lens is an aspheric surface. Alternatively, the object-side surface and the image-side surface of each of the first lens, the second lens, the third lens and the fourth lens are aspheric surfaces.

However, it should be understood by those skilled in the art that the various results and advantages described in the present specification may be obtained by changing the number of the lenses constituting the optical lens assembly without departing from the technical solution claimed by the present disclosure. For example, although the optical lens assembly having four lenses is described as an example in the implementations, the optical lens assembly is not limited to the four lenses. If desired, the optical lens assembly may also include other numbers of lenses.

Specific embodiments of the optical test system that may be applied to the above implementations are further described below with reference to the accompanying drawings.

Embodiment 1

An optical test system according to Embodiment 1 of the present disclosure is described below with reference to FIGS. 1-2D. FIG. 1 is a schematic structural diagram of the optical test system according to Embodiment 1 of the present disclosure.

As shown in FIG. 1, the optical test system may include a distance extension module T and an optical lens assembly. The optical lens assembly may include, sequentially along an optical axis from an object side to an image side, a diaphragm STO, a first lens E1, a second lens E2, a third lens E3, a fourth lens E4, an optical filter E5 and an image plane S11.

The first lens E1 has a positive refractive power, an object-side surface S1 of the first lens E1 is a convex surface, and an image-side surface S2 of the first lens E1 is a convex surface. The second lens E2 has a negative refractive power, an object-side surface S3 of the second lens E2 is a concave surface, and an image-side surface S4 of the second lens E2 is a concave surface. The third lens E3 has a positive refractive power, an object-side surface S5 of the third lens E3 is a concave surface, and an image-side surface S6 of the third lens E3 is a convex surface. The fourth lens E4 has a negative refractive power, an object-side surface S7 of the fourth lens E4 is a convex surface, and an image-side surface S8 of the fourth lens E4 is a concave surface. The optical filter E5 has an object-side surface S9 and an image-side surface S10. Light sequentially passes through the distance extension module T and the surfaces S1-S10 and finally forms an image on the image plane S11.

Table 1 shows basic parameters of the optical test system in Embodiment 1. Here, the units of a radius of curvature, a thickness/distance and a focal length are millimeters (mm).

TABLE 1

| surface number | surface type | radius of curvature | thickness/ distance | material refractive index | abbe number | focal length | conic coefficient |
|---|---|---|---|---|---|---|---|
| OBJ | spherical | infinite | infinite | | | | |
| T | spherical | infinite | D | | | | |
|  | spherical | infinite | 4.1900 | | | | |
| STO | spherical | infinite | −0.0496 | | | | |
| S1 | aspheric | 0.8485 | 0.3892 | 1.55 | 56.1 | 1.36 | −1.7524 |
| S2 | aspheric | −5.1185 | 0.1256 | | | | 44.4641 |
| S3 | aspheric | −41.9905 | 0.2500 | 1.67 | 20.4 | −5.06 | −90.0000 |
| S4 | aspheric | 3.6763 | 0.2515 | | | | 32.6320 |
| S5 | aspheric | −1.3366 | 0.4671 | 1.55 | 56.1 | 1.82 | 0.0968 |
| S6 | aspheric | −0.6399 | 0.0819 | | | | −2.3011 |
| S7 | aspheric | 0.7731 | 0.4000 | 1.55 | 56.1 | −2.14 | −21.5888 |
| S8 | aspheric | 0.3804 | 0.4605 | | | | −3.7296 |
| S9 | spherical | infinite | 0.2100 | 1.52 | 64.2 | | |

TABLE 1-continued

| surface number | surface type | radius of curvature | thickness/ distance | material refractive index | abbe number | focal length | conic coefficient |
|---|---|---|---|---|---|---|---|
| S10 | spherical | infinite | 0.4643 | | | | |
| S11 | spherical | infinite | | | | | |

In this example, the distance extension module T may be one or more lenses, and has a total thickness D. A total effective focal length f of the optical lens assembly is 1.19 mm, and a total track length TTL of the optical lens assembly (i.e., a distance from the object-side surface S1 of the first lens E1 to the image plane S11 of the optical lens assembly along the optical axis) is 3.10 mm. Half of a diagonal length ImgH of an effective pixel area on the image plane S11 of the optical lens assembly is 1.81 mm. An F-number Fno of the optical lens assembly is 3.04, and half of a maximal field-of-view Semi-FOV of the optical lens assembly is 38.4°.

In Embodiment 1, the object-side surface and the image-side surface of any lens in the first to fourth lenses E1-E4 are both aspheric surfaces, and the surface type x of an aspheric lens may be defined using, but not limited to, the following formula:

$$x = \frac{ch^2}{1+\sqrt{1-(k+1)c^2h^2}} + \sum A_i h^i. \quad (1)$$

Here, x is the sag—the axis-component of the displacement of the surface from the aspheric vertex, when the surface is at height h from the optical axis; c is the paraxial curvature of the aspheric surface, and c=1/R (i.e., the paraxial curvature c is the reciprocal of the radius of curvature R in Table 1 above); k is the conic coefficient; and Ai is the correction coefficient of an i-th order of the aspheric surface. Table 2 shows the high-order coefficients A4, A6, A8, A10, A12, A14, A16, A18 and A20 applicable to the aspheric surfaces S1-S8 in Embodiment 1.

Figures 2A, 2B:
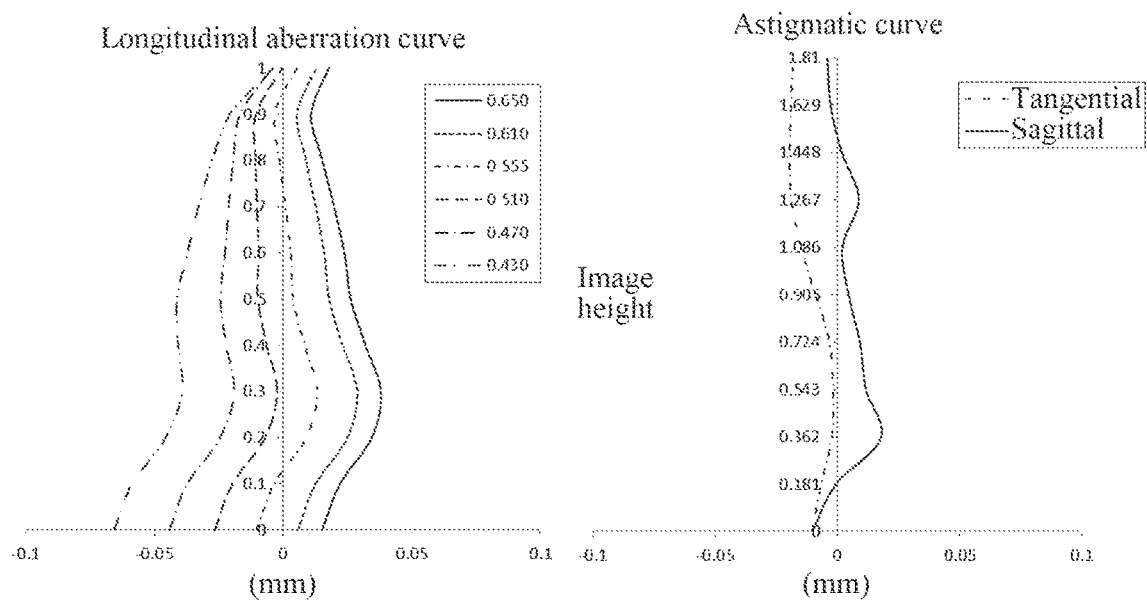

FIG. 2A illustrates a longitudinal aberration curve of the optical lens assembly in Embodiment 1, representing deviations of focal points of light of different wavelengths converged after passing through the optical lens assembly. FIG. 2B illustrates an astigmatic curve of the optical lens assembly in Embodiment 1, representing a curvature of a tangential image plane and a curvature of a sagittal image plane. FIG. 2C illustrates a distortion curve of the optical lens assembly in Embodiment 1, representing amounts of distortion corresponding to different image heights. FIG. 2D illustrates a lateral color curve of the optical lens assembly in Embodiment 1, representing deviations of different image heights on the image plane after light passes through the optical lens assembly. It can be seen from FIGS. 2A-2D that the optical lens assembly given in Embodiment 1 can achieve a good imaging quality.

Embodiment 2

An optical test system according to Embodiment 2 of the present disclosure is described below with reference to FIGS. 3-4D. In this embodiment and the following embodiments, for the sake of brevity, some descriptions similar to those in Embodiment 1 will be omitted. FIG. 3 is a schematic structural diagram of the optical test system according to Embodiment 2 of the present disclosure.

As shown in FIG. 3, the optical test system may include a distance extension module T and an optical lens assembly. The optical lens assembly may include, sequentially along an optical axis from an object side to an image side, a diaphragm STO, a first lens E1, a second lens E2, a third lens E3, a fourth lens E4, an optical filter E5 and an image plane S11.

TABLE 2

| surface number | A4 | A6 | A8 | A10 | A12 |
|---|---|---|---|---|---|
| S1 | 6.1608E−04 | −7.2288E−04 | −1.2829E−04 | −1.6449E−05 | −7.2890E−06 |
| S2 | −3.1456E−02 | −2.1763E−03 | −1.1497E−04 | −2.1753E−05 | −6.3053E−07 |
| S3 | −5.4421E−02 | −9.8439E−04 | 4.5667E−04 | 1.3463E−04 | −1.1315E−05 |
| S4 | −5.1223E−02 | 7.1513E−03 | 2.7081E−03 | 3.5645E−05 | −3.7741E−04 |
| S5 | −2.3277E−02 | −2.3171E−03 | 1.8257E−04 | −6.7296E−04 | −7.6435E−04 |
| S6 | −1.4358E−01 | 7.6368E−02 | −1.0878E−02 | 3.3643E−03 | −5.8705E−03 |
| S7 | −3.2517E−01 | 1.0297E−01 | −3.1278E−02 | 9.3043E−03 | −5.3882E−03 |
| S8 | −7.8857E−01 | 1.2212E−01 | −5.0046E−02 | 1.2792E−02 | −9.5504E−03 |

| surface number | A14 | A16 | A18 | A20 |
|---|---|---|---|---|
| S1 | 9.8323E−07 | −2.0162E−06 | 4.0877E−07 | 9.6288E−08 |
| S2 | −8.5449E−07 | 7.0880E−07 | −1.2280E−06 | 4.4855E−07 |
| S3 | 9.5229E−06 | −4.1410E−06 | 3.0295E−06 | −2.6146E−06 |
| S4 | −3.4993E−04 | −2.9469E−04 | −1.8507E−04 | −9.3199E−05 |
| S5 | −1.3855E−04 | −5.8474E−06 | 1.1119E−04 | 1.7470E−04 |
| S6 | 1.6395E−03 | −4.3542E−04 | 5.8827E−04 | −2.2007E−04 |
| S7 | 3.4739E−03 | −1.6855E−03 | 9.7396E−04 | −5.7179E−04 |
| S8 | 4.2218E−03 | −1.9018E−03 | 5.5467E−04 | −1.1668E−03 |

The first lens E1 has a positive refractive power, an object-side surface S1 of the first lens E1 is a convex surface, and an image-side surface S2 of the first lens E1 is a convex surface. The second lens E2 has a negative refractive power, an object-side surface S3 of the second lens E2 is a concave surface, and an image-side surface S4 of the second lens E2 is a concave surface. The third lens E3 has a positive refractive power, an object-side surface S5 of the third lens E3 is a concave surface, and an image-side surface S6 of the third lens E3 is a convex surface. The fourth lens E4 has a negative refractive power, an object-side surface S7 of the fourth lens E4 is a concave surface, and an image-side surface S8 of the fourth lens E4 is a concave surface. The optical filter E5 has an object-side surface S9 and an image-side surface S10. Light sequentially passes through the distance extension module T and the surfaces S1-S10 and finally forms an image on the image plane S11.

In this example, the distance extension module T may be one or more lenses, and has a total thickness D. A total effective focal length f of the optical lens assembly is 1.28 mm, and a total track length TTL of the optical lens assembly is 3.50 mm. Half of a diagonal length ImgH of an effective pixel area on the image plane S11 of the optical lens assembly is 1.81 mm. An F-number Fno of the optical lens assembly is 3.04, and half of a maximal field-of-view Semi-FOV of the optical lens assembly is 38.7°.

Table 3 shows basic parameters of the optical test system in Embodiment 2. Here, the units of a radius of curvature, a thickness/distance and a focal length are millimeters (mm). Table 4 shows the high-order coefficients A4, A6, A8, A10, A12, A14, A16, A18 and A20 applicable to the aspheric surfaces S1-S8 in Embodiment 2. Here, the surface type of each aspheric surface may be defined using the formula (1) given in Embodiment 1.

TABLE 3

| surface number | surface type | radius of curvature | thickness/distance | material refractive index | abbe number | focal length | conic coefficient |
|---|---|---|---|---|---|---|---|
| OBJ | spherical | infinite | infinite | | | | |
| T | spherical | infinite | D | | | | |
|  | spherical | infinite | 4.1650 | | | | |
| STO | spherical | infinite | −0.0225 | | | | |
| S1 | aspheric | 1.0636 | 0.3917 | 1.55 | 56.1 | 1.47 | −2.8766 |
| S2 | aspheric | −2.8830 | 0.1697 | | | | 13.0467 |
| S3 | aspheric | −3.7735 | 0.3246 | 1.67 | 20.4 | −3.04 | 25.9688 |
| S4 | aspheric | 4.5267 | 0.1954 | | | | −8.0469 |
| S5 | aspheric | −2.0082 | 0.5672 | 1.55 | 56.1 | 1.00 | −0.1072 |
| S6 | aspheric | −0.4708 | 0.2102 | | | | −3.2743 |
| S7 | aspheric | −70.0000 | 0.4555 | 1.55 | 56.1 | −1.10 | −90.0000 |
| S8 | aspheric | 0.6070 | 0.4860 | | | | −3.3817 |
| S9 | spherical | infinite | 0.2100 | 1.52 | 64.2 | | |
| S10 | spherical | infinite | 0.4898 | | | | |
| S11 | spherical | infinite | | | | | |

TABLE 4

| surface number | A4 | A6 | A8 | A10 | A12 |
|---|---|---|---|---|---|
| S1 | −4.3823E−03 | −2.0832E−03 | −4.2472E−04 | −9.3780E−05 | −2.1870E−05 |
| S2 | −5.7229E−02 | −4.8191E−03 | −5.9742E−04 | −1.1047E−04 | −1.3909E−05 |
| S3 | −8.2942E−02 | 8.3952E−04 | 1.1724E−03 | 3.2748E−04 | −5.2856E−05 |
| S4 | −6.9995E−02 | 7.5475E−03 | 1.9404E−03 | 7.0050E−03 | −4.8447E−05 |
| S5 | −9.1541E−03 | 8.0425E−03 | 7.7608E−03 | 3.2366E−03 | −6.6272E−04 |
| S6 | −1.8033E−01 | 4.7205E−02 | 5.0386E−03 | 6.5670E−03 | 4.9123E−04 |
| S7 | −3.5995E−02 | −5.0616E−02 | 2.6148E−02 | −1.2695E−02 | 5.5638E−03 |
| S8 | −5.7271E−01 | 5.3858E−02 | −1.5100E−02 | 4.5973E−04 | 9.0654E−04 |

| surface number | A14 | A16 | A18 | A20 |
|---|---|---|---|---|
| S1 | 1.9690E−06 | 2.1470E−06 | 3.4805E−06 | 9.0668E−08 |
| S2 | 1.0985E−05 | 1.2643E−05 | 6.5637E−06 | 3.6330E−06 |
| S3 | 1.0468E−05 | −1.2128E−05 | 4.2600E−06 | −4.1102E−06 |
| S4 | 7.4450E−05 | −1.0931E−05 | 6.1407E−06 | −8.8030E−06 |
| S5 | −2.8196E−04 | −2.7587E−04 | −9.2038E−06 | 3.1341E−05 |
| S6 | 2.2066E−04 | −5.8096E−04 | −5.0423E−04 | −5.9756E−04 |
| S7 | −1.9623E−03 | 8.8139E−04 | −6.8927E−04 | −3.4714E−06 |
| S8 | −4.2300E−04 | 8.1309E−04 | −4.7038E−04 | 1.6808E−04 |

Figure 4A:
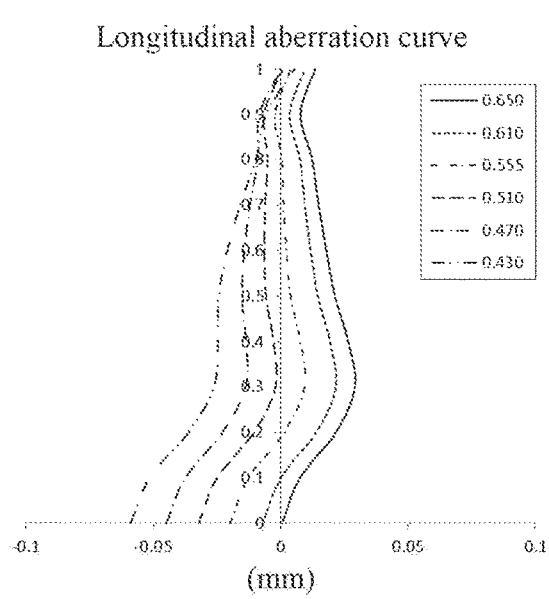
FIGS. 4A-4D respectively show a longitudinal aberration curve, an astigmatic curve, a distortion curve and a lateral color curve of the optical lens assembly in Embodiment 2.
Figure 4B:
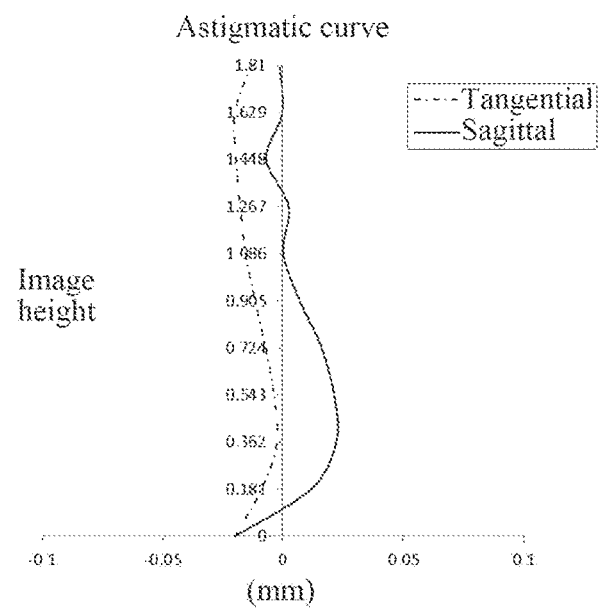
Figure 4C:
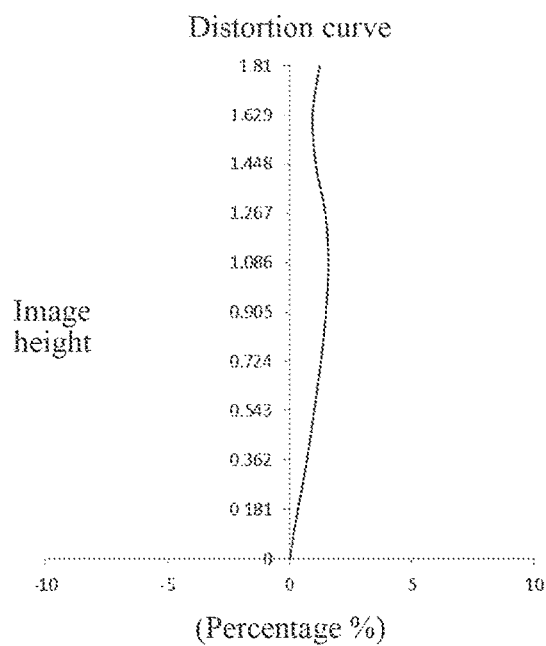
Figure 4D:
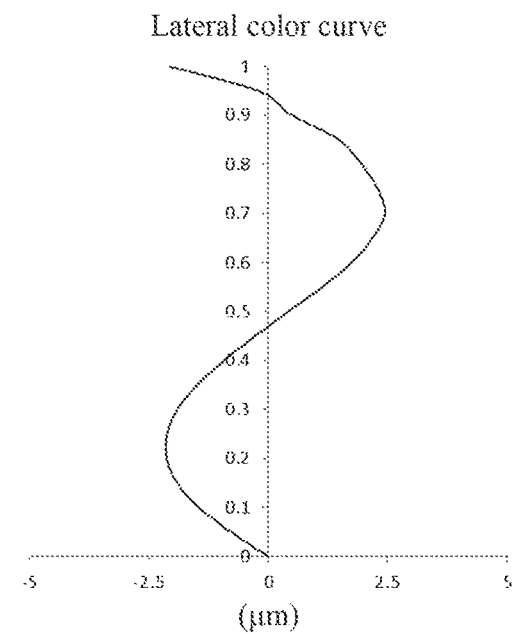

FIG. 4A illustrates a longitudinal aberration curve of the optical lens assembly in Embodiment 2, representing deviations of focal points of light of different wavelengths converged after passing through the optical lens assembly. FIG. 4B illustrates an astigmatic curve of the optical lens assembly in Embodiment 2, representing a curvature of a tangential image plane and a curvature of a sagittal image plane. FIG. 4C illustrates a distortion curve of the optical lens assembly in Embodiment 2, representing amounts of distortion corresponding to different image heights. FIG. 4D illustrates a lateral color curve of the optical lens assembly in Embodiment 2, representing deviations of different image heights on the image plane after light passes through the optical lens assembly. It can be seen from FIGS. 4A-4D that the optical lens assembly given in Embodiment 2 can achieve a good imaging quality.

Embodiment 3

Figure 5:
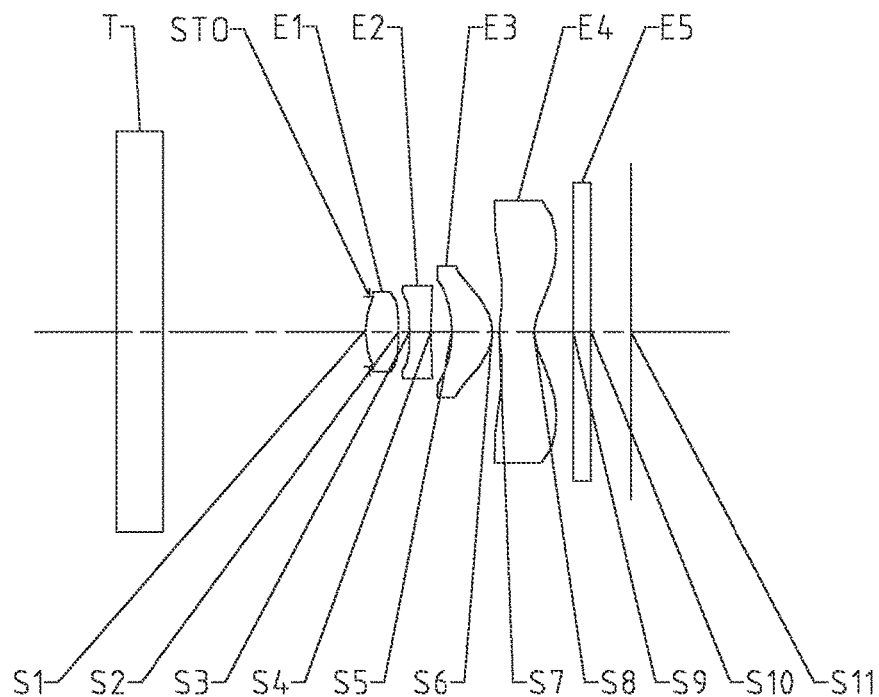
FIG. 5 is a schematic structural diagram of an optical test system according to Embodiment 3 of the present disclosure.

An optical test system according to Embodiment 3 of the present disclosure is described below with reference to FIGS. 5-6D. FIG. 5 is a schematic structural diagram of the optical test system according to Embodiment 3 of the present disclosure.

As shown in FIG. 5, the optical test system may include a distance extension module T and an optical lens assembly. The optical lens assembly may include, sequentially along an optical axis from an object side to an image side, a diaphragm STO, a first lens E1, a second lens E2, a third lens E3, a fourth lens E4, an optical filter E5 and an image plane S11.

The first lens E1 has a positive refractive power, an object-side surface S1 of the first lens E1 is a convex surface, and an image-side surface S2 of the first lens E1 is a convex surface. The second lens E2 has a negative refractive power, an object-side surface S3 of the second lens E2 is a concave surface, and an image-side surface S4 of the second lens E2 is a concave surface. The third lens E3 has a positive refractive power, an object-side surface S5 of the third lens E3 is a concave surface, and an image-side surface S6 of the third lens E3 is a convex surface. The fourth lens E4 has a negative refractive power, an object-side surface S7 of the fourth lens E4 is a convex surface, and an image-side surface S8 of the fourth lens E4 is a concave surface. The optical filter E5 has an object-side surface S9 and an image-side surface S10. Light sequentially passes through the distance extension module T and the surfaces S1-S10 and finally forms an image on the image plane S11.

In this example, the distance extension module T may be one or more lenses, and has a total thickness D. A total effective focal length f of the optical lens assembly is 1.19 mm, and a total track length TTL of the optical lens assembly is 3.10 mm. Half of a diagonal length ImgH of an effective pixel area on the image plane S11 of the optical lens assembly is 1.81 mm. An F-number Fno of the optical lens assembly is 3.04, and half of a maximal field-of-view Semi-FOV of the optical lens assembly is 38.4°.

Table 5 shows basic parameters of the optical test system in Embodiment 3. Here, the units of a radius of curvature, a thickness/distance and a focal length are millimeters (mm). Table 6 shows the high-order coefficients A4, A6, A8, A10, A12, A14, A16, A18 and A20 applicable to the aspheric surfaces S1-S8 in Embodiment 3. Here, the surface type of each aspheric surface may be defined using the formula (1) given in Embodiment 1.

TABLE 5

| surface number | surface type | radius of curvature | thickness/ distance | material refractive index | abbe number | focal length | conic coefficient |
|---|---|---|---|---|---|---|---|
| OBJ | spherical | infinite | infinite | | | | |
| T | spherical | infinite | D | | | | |
|  | spherical | infinite | 4.1900 | | | | |
| STO | spherical | infinite | −0.0490 | | | | |
| S1 | aspheric | 0.8486 | 0.3888 | 1.55 | 56.1 | 1.36 | −1.7623 |
| S2 | aspheric | −5.1057 | 0.1251 | | | | 45.7067 |
| S3 | aspheric | −55.7043 | 0.2500 | 1.67 | 20.4 | −5.08 | −90.0000 |
| S4 | aspheric | 3.6112 | 0.2523 | | | | 32.1059 |
| S5 | aspheric | −1.3394 | 0.4694 | 1.55 | 56.1 | 1.74 | 0.1629 |
| S6 | aspheric | −0.6241 | 0.0808 | | | | −2.3495 |
| S7 | aspheric | 0.8049 | 0.4000 | 1.55 | 56.1 | −2.00 | −22.3792 |
| S8 | aspheric | 0.3820 | 0.4599 | | | | −3.7360 |
| S9 | spherical | infinite | 0.2100 | 1.52 | 64.2 | | |
| S10 | spherical | infinite | 0.4637 | | | | |
| S11 | spherical | infinite | | | | | |

TABLE 6

| surface number | A4 | A6 | A8 | A10 | A12 |
|---|---|---|---|---|---|
| S1 | 5.8442E−04 | −7.2938E−04 | −1.2906E−04 | −1.6548E−05 | −7.4085E−06 |
| S2 | −3.1512E−02 | −2.1644E−03 | −1.1434E−04 | −2.1961E−05 | −7.5340E−07 |
| S3 | −5.4329E−02 | −9.4956E−04 | 4.5633E−04 | 1.3473E−04 | −1.2569E−05 |
| S4 | −5.1291E−02 | 7.0091E−03 | 2.6376E−03 | 2.4082E−06 | −3.8399E−04 |
| S5 | −2.3983E−02 | −2.4999E−03 | 1.3101E−04 | −7.6509E−04 | −7.9095E−04 |
| S6 | −1.4319E−01 | 7.5073E−02 | −9.9884E−03 | 2.8542E−03 | −5.7434E−03 |
| S7 | −3.2259E−01 | 1.0329E−01 | −3.1324E−02 | 9.2706E−03 | −5.3730E−03 |
| S8 | −7.8893E−01 | 1.2325E−01 | −5.0183E−02 | 1.2817E−02 | −9.6509E−03 |

| surface number | A14 | A16 | A18 | A20 |
|---|---|---|---|---|
| S1 | 9.8217E−07 | −2.0345E−06 | 4.4500E−07 | 8.5220E−08 |
| S2 | −8.8584E−07 | 6.2850E−07 | −1.2104E−06 | 4.5451E−07 |
| S3 | 9.9462E−06 | −4.5270E−06 | 3.1842E−06 | −2.8257E−06 |
| S4 | −3.4920E−04 | −2.9053E−04 | −1.8205E−04 | −9.1041E−05 |
| S5 | −1.4328E−04 | 1.5499E−05 | 1.2307E−04 | 1.7685E−04 |

TABLE 6-continued

| | | | | |
|---|---|---|---|---|
| S6 | 1.5666E-03 | -3.0702E-04 | 6.1483E-04 | -1.6310E-04 |
| S7 | 3.4664E-03 | -1.6948E-03 | 9.7199E-04 | -5.7372E-04 |
| S8 | 4.2407E-03 | -1.9096E-03 | 5.8161E-04 | -1.1356E-03 |

Figures 6A, 6B:
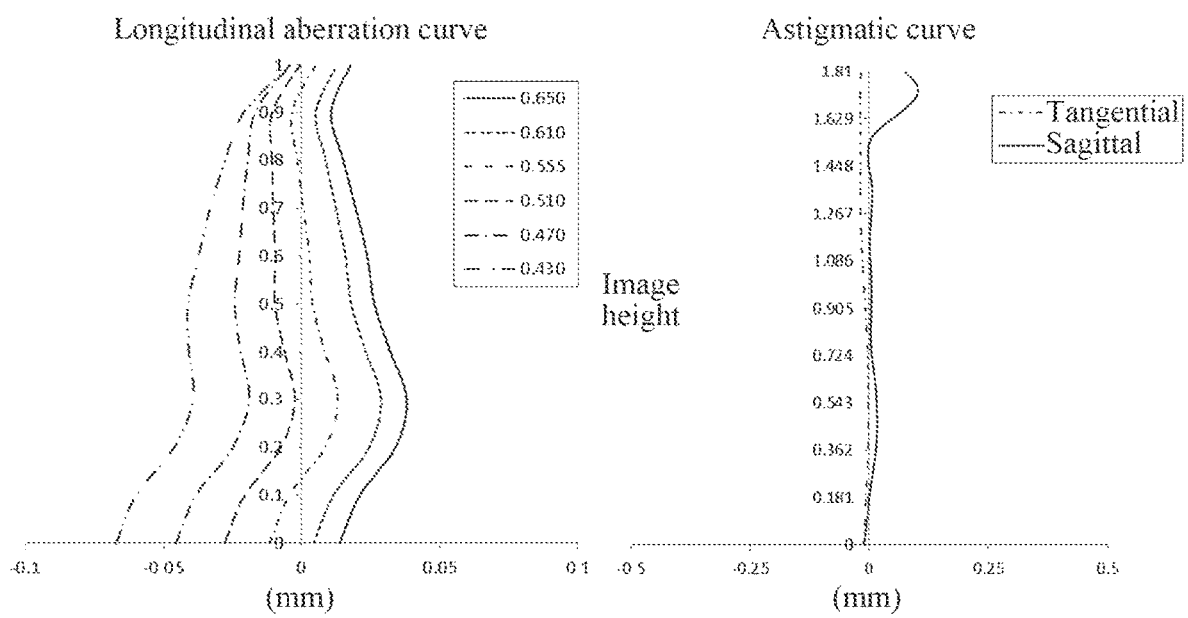
FIGS. 6A-6D respectively show a longitudinal aberration curve, an astigmatic curve, a distortion curve and a lateral color curve of the optical lens assembly in Embodiment 3.
Figures 6C, 6D:
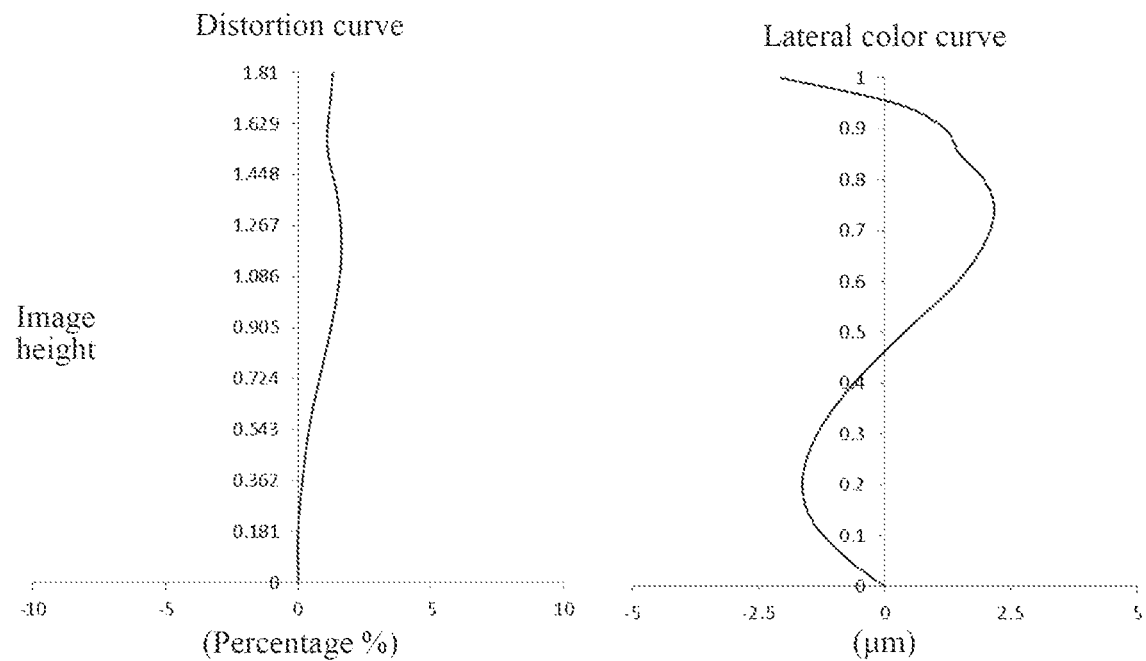

FIG. 6A illustrates a longitudinal aberration curve of the optical lens assembly in Embodiment 3, representing deviations of focal points of light of different wavelengths converged after passing through the optical lens assembly. FIG. 6B illustrates an astigmatic curve of the optical lens assembly in Embodiment 3, representing a curvature of a tangential image plane and a curvature of a sagittal image plane. FIG. 6C illustrates a distortion curve of the optical lens assembly in Embodiment 3, representing amounts of distortion corresponding to different image heights. FIG. 6D illustrates a lateral color curve of the optical lens assembly in Embodiment 3, representing deviations of different image heights on the image plane after light passes through the optical lens assembly. It can be seen from FIGS. 6A-6D that the optical lens assembly given in Embodiment 3 can achieve a good imaging quality.

Embodiment 4

Figure 7:
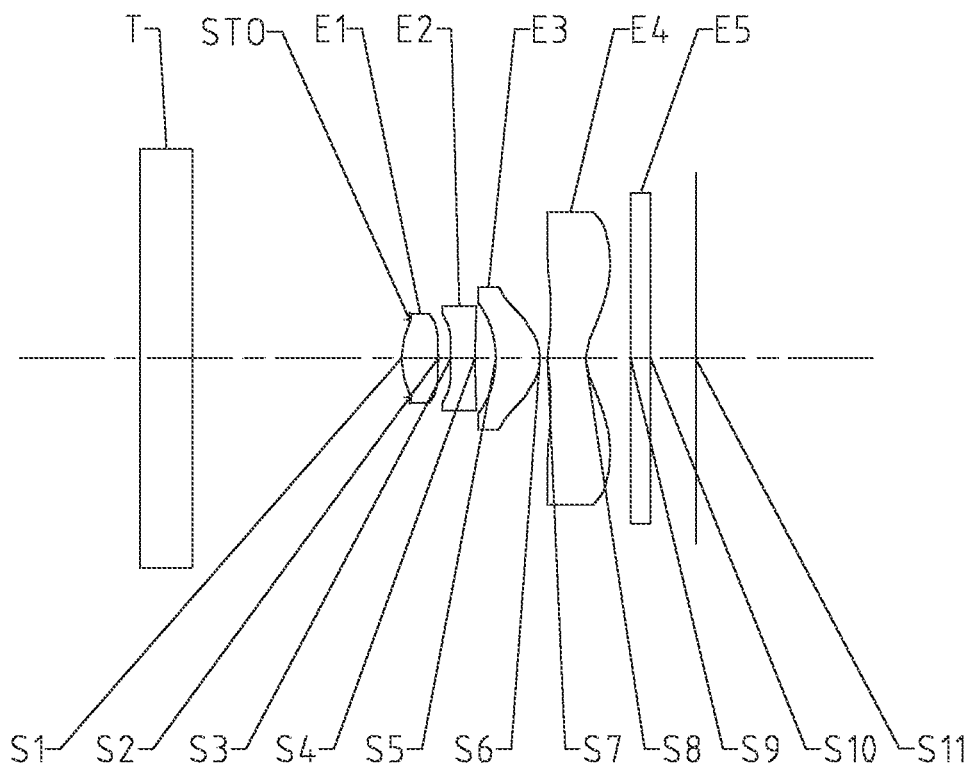
FIG. 7 is a schematic structural diagram of an optical test system according to Embodiment 4 of the present disclosure.

An optical test system according to Embodiment 4 of the present disclosure is described below with reference to FIGS. 7-8D. FIG. 7 is a schematic structural diagram of the optical test system according to Embodiment 4 of the present disclosure.

As shown in FIG. 7, the optical test system may include a distance extension module T and an optical lens assembly. The optical lens assembly may include, sequentially along an optical axis from an object side to an image side, a diaphragm STO, a first lens E1, a second lens E2, a third lens E3, a fourth lens E4, an optical filter E5 and an image plane S11.

The first lens E1 has a positive refractive power, an object-side surface S1 of the first lens E1 is a convex surface, and an image-side surface S2 of the first lens E1 is a convex surface. The second lens E2 has a negative refractive power, an object-side surface S3 of the second lens E2 is a concave surface, and an image-side surface S4 of the second lens E2 is a concave surface. The third lens E3 has a positive refractive power, an object-side surface S5 of the third lens E3 is a concave surface, and an image-side surface S6 of the third lens E3 is a convex surface. The fourth lens E4 has a negative refractive power, an object-side surface S7 of the fourth lens E4 is a convex surface, and an image-side surface S8 of the fourth lens E4 is a concave surface. The optical filter E5 has an object-side surface S9 and an image-side surface S10. Light sequentially passes through the distance extension module T and the surfaces S1-S10 and finally forms an image on the image plane S11.

In this example, the distance extension module T may be one or more lenses, and has a total thickness D. A total effective focal length f of the optical lens assembly is 1.17 mm, and a total track length TTL of the optical lens assembly is 3.10 mm. Half of a diagonal length ImgH of an effective pixel area on the image plane S11 of the optical lens assembly is 1.81 mm. An F-number Fno of the optical lens assembly is 3.04, and half of a maximal field-of-view Semi-FOV of the optical lens assembly is 38.1°.

Table 7 shows basic parameters of the optical test system in Embodiment 4. Here, the units of a radius of curvature, a thickness/distance and a focal length are millimeters (mm). Table 8 shows the high-order coefficients A4, A6, A8, A10, A12, A14, A16, A18 and A20 applicable to the aspheric surfaces S1-S8 in Embodiment 4. Here, the surface type of each aspheric surface may be defined using the formula (1) given in Embodiment 1.

TABLE 7

| surface number | surface type | radius of curvature | thickness/ distance | material refractive index | abbe number | focal length | conic coefficient |
|---|---|---|---|---|---|---|---|
| OBJ | spherical | infinite | infinite | | | | |
| T | spherical | infinite | D | | | | |
| | spherical | infinite | 4.0700 | | | | |
| STO | spherical | infinite | -0.0838 | | | | |
| S1 | aspheric | 0.8087 | 0.3883 | 1.55 | 56.1 | 1.33 | -1.5472 |
| S2 | aspheric | -5.8118 | 0.1331 | | | | -4.8238 |
| S3 | aspheric | -100.0000 | 0.2500 | 1.67 | 20.4 | -5.41 | -90.0000 |
| S4 | aspheric | 3.7467 | 0.2226 | | | | 36.6383 |
| S5 | aspheric | -1.1184 | 0.4624 | 1.55 | 56.1 | 1.71 | -0.1922 |
| S6 | aspheric | -0.5828 | 0.0805 | | | | -2.3840 |
| S7 | aspheric | 0.8263 | 0.4000 | 1.55 | 56.1 | -2.00 | -19.8186 |
| S8 | aspheric | 0.3899 | 0.4746 | | | | -3.8310 |
| S9 | spherical | infinite | 0.2100 | 1.52 | 64.2 | | |
| S10 | spherical | infinite | 0.4784 | | | | |
| S11 | spherical | infinite | | | | | |

TABLE 8

| surface number | A4 | A6 | A8 | A10 | A12 |
|---|---|---|---|---|---|
| S1 | 1.2685E-03 | -6.3611E-04 | -1.3524E-04 | -9.8139E-06 | -9.9107E-06 |
| S2 | -3.0166E-02 | -2.5586E-03 | -1.3712E-04 | -2.4687E-05 | 1.5717E-06 |

TABLE 8-continued

| | | | | | |
|---|---|---|---|---|---|
| S3 | −5.4295E−02 | −1.8429E−03 | 4.3813E−04 | 1.7076E−04 | −6.9252E−06 |
| S4 | −5.0398E−02 | 7.1779E−03 | 4.1887E−03 | 4.5784E−04 | −3.3659E−04 |
| S5 | −2.0761E−02 | −1.5796E−03 | 6.3439E−04 | −1.6368E−03 | −1.7714E−03 |
| S6 | −1.4519E−01 | 7.6316E−02 | −8.8369E−03 | −6.4441E−04 | −5.5140E−03 |
| S7 | −2.9890E−01 | 1.0502E−01 | −3.2132E−02 | 8.5621E−03 | −4.6899E−03 |
| S8 | −7.5177E−01 | 1.2896E−01 | −4.7179E−02 | 1.0002E−02 | −9.0397E−03 |

| surface number | A14 | A16 | A18 | A20 |
|---|---|---|---|---|
| S1 | 3.2700E−06 | −2.8496E−06 | 1.1218E−06 | −2.4444E−07 |
| S2 | −3.2710E−07 | −6.6190E−08 | −1.2652E−06 | 4.9307E−07 |
| S3 | 1.3570E−05 | −5.3759E−06 | 3.1807E−06 | −4.1936E−06 |
| S4 | −4.0154E−04 | −3.6086E−04 | −2.3761E−04 | −1.1692E−04 |
| S5 | −7.5396E−04 | −2.0609E−04 | 1.8899E−04 | 4.2598E−04 |
| S6 | 2.0539E−03 | 6.7708E−04 | 9.2361E−04 | 1.8305E−04 |
| S7 | 3.1528E−03 | −1.7081E−03 | 8.7113E−04 | −5.8814E−04 |
| S8 | 3.4546E−03 | −1.696lE−03 | 1.0559E−04 | −1.0503E−03 |

Figure 8A:
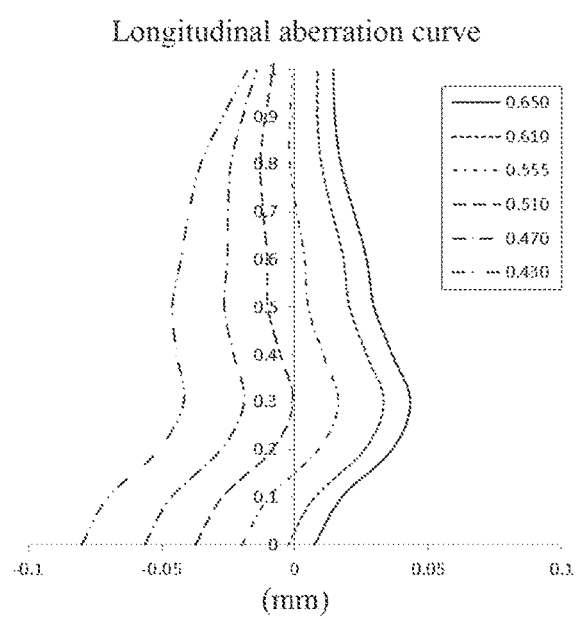
FIGS. 8A-8D respectively show a longitudinal aberration curve, an astigmatic curve, a distortion curve and a lateral color curve of the optical lens assembly in Embodiment 4.
Figure 8B:
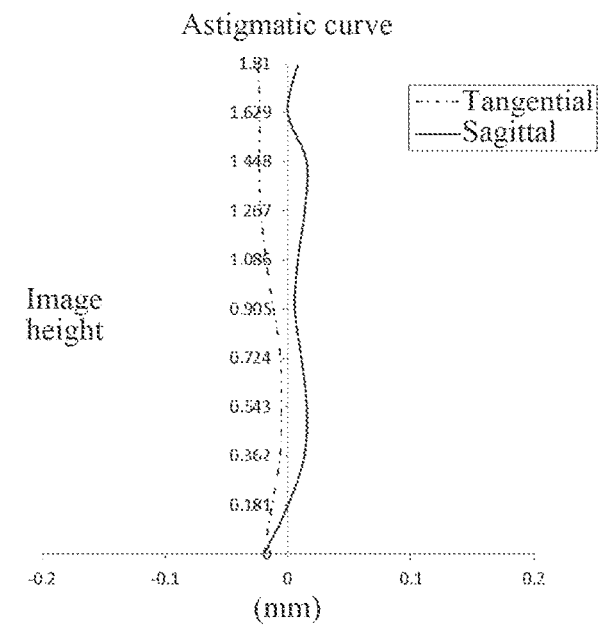
Figure 8C:
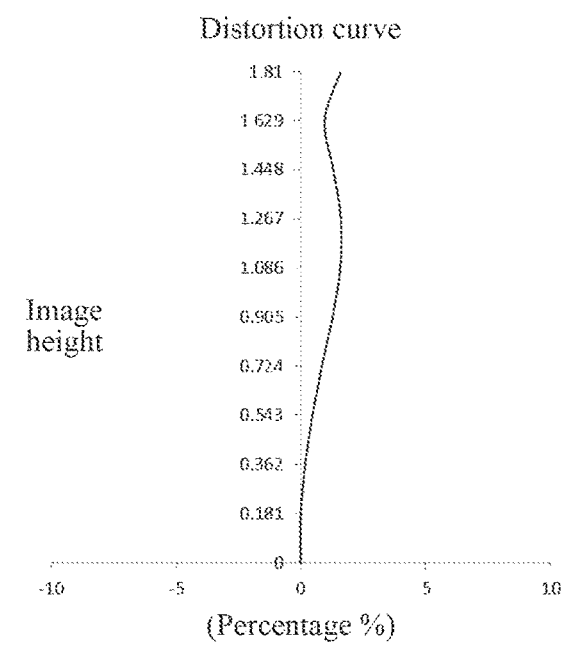
Figure 8D:
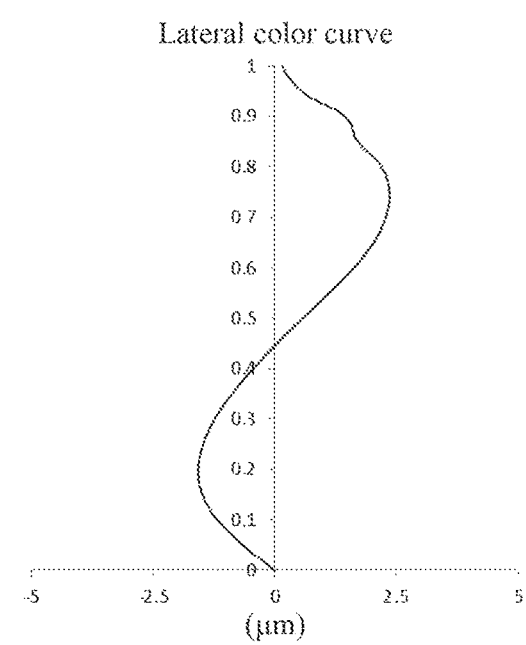

FIG. 8A illustrates a longitudinal aberration curve of the optical lens assembly in Embodiment 4, representing deviations of focal points of light of different wavelengths converged after passing through the optical lens assembly. FIG. 8B illustrates an astigmatic curve of the optical lens assembly in Embodiment 4, representing a curvature of a tangential image plane and a curvature of a sagittal image plane. FIG. 8C illustrates a distortion curve of the optical lens assembly in Embodiment 4, representing amounts of distortion corresponding to different image heights. FIG. 8D illustrates a lateral color curve of the optical lens assembly in Embodiment 4, representing deviations of different image heights on the image plane after light passes through the optical lens assembly. It can be seen from FIGS. 8A-8D that the optical lens assembly given in Embodiment 4 can achieve a good imaging quality.

Embodiment 5

Figure 9:
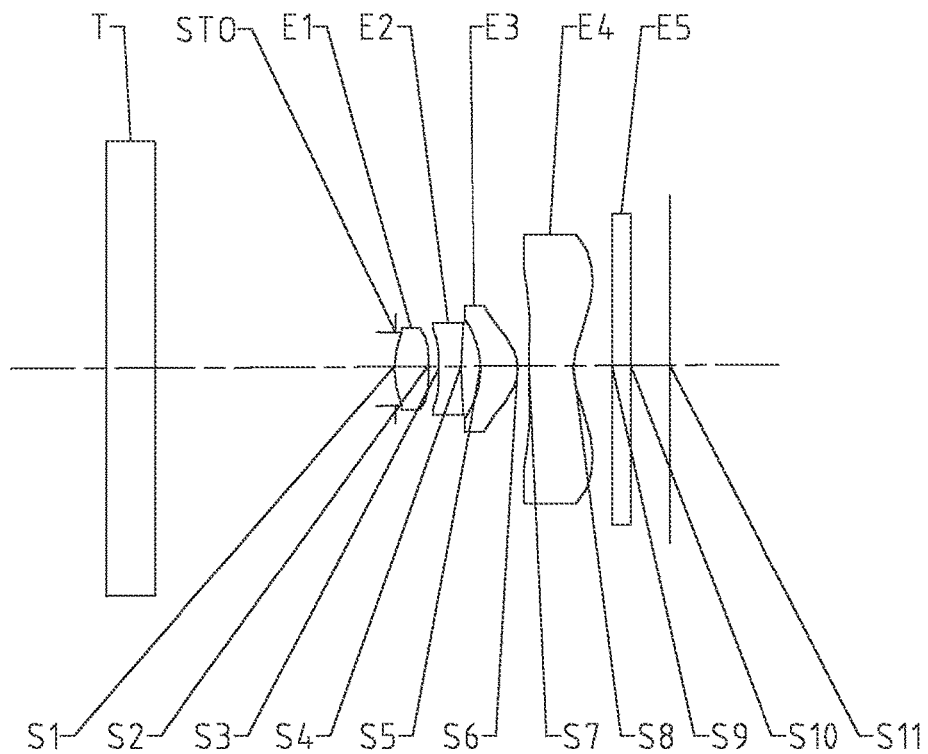
FIG. 9 is a schematic structural diagram of an optical test system according to Embodiment 5 of the present disclosure.

An optical test system according to Embodiment 5 of the present disclosure is described below with reference to FIGS. 9-10D. FIG. 9 is a schematic structural diagram of the optical test system according to Embodiment 5 of the present disclosure.

As shown in FIG. 9, the optical test system may include a distance extension module T and an optical lens assembly. The optical lens assembly may include, sequentially along an optical axis from an object side to an image side, a diaphragm STO, a first lens E1, a second lens E2, a third lens E3, a fourth lens E4, an optical filter E5 and an image plane S11.

The first lens E1 has a positive refractive power, an object-side surface S1 of the first lens E1 is a convex surface, and an image-side surface S2 of the first lens E1 is a convex surface. The second lens E2 has a negative refractive power, an object-side surface S3 of the second lens E2 is a concave surface, and an image-side surface S4 of the second lens E2 is a concave surface. The third lens E3 has a positive refractive power, an object-side surface S5 of the third lens E3 is a concave surface, and an image-side surface S6 of the third lens E3 is a convex surface. The fourth lens E4 has a negative refractive power, an object-side surface S7 of the fourth lens E4 is a concave surface, and an image-side surface S8 of the fourth lens E4 is a concave surface. The optical filter E5 has an object-side surface S9 and an image-side surface S10. Light sequentially passes through the distance extension module T and the surfaces S1-S10 and finally forms an image on the image plane S11.

In this example, the distance extension module T may be one or more lenses, and has a total thickness D. A total effective focal length f of the optical lens assembly is 1.25 mm, and a total track length TTL of the optical lens assembly is 3.10 mm. Half of a diagonal length ImgH of an effective pixel area on the image plane S11 of the optical lens assembly is 1.81 mm. An F-number Fno of the optical lens assembly is 3.04, and half of a maximal field-of-view Semi-FOV of the optical lens assembly is 38.1°.

Table 9 shows basic parameters of the optical test system in Embodiment 5. Here, the units of a radius of curvature, a thickness/distance and a focal length are millimeters (mm). Table 10 shows the high-order coefficients A4, A6, A8, A10, A12, A14, A16, A18 and A20 applicable to the aspheric surfaces S1-S8 in Embodiment 5. Here, the surface type of each aspheric surface may be defined using the formula (1) given in Embodiment 1.

TABLE 9

| | | | | material | | | |
|---|---|---|---|---|---|---|---|
| surface number | surface type | radius of curvature | thickness/ distance | refractive index | abbe number | focal length | conic coefficient |
| OBJ | spherical | infinite | infinite | | | | |
| T | spherical | infinite | D | | | | |
| | spherical | infinite | 4.4900 | | | | |
| STO | spherical | infinite | −0.0141 | | | | |
| S1 | aspheric | 0.8673 | 0.3905 | 1.55 | 56.1 | 1.33 | −2.0225 |
| S2 | aspheric | −3.6927 | 0.1097 | | | | 48.4460 |
| S3 | aspheric | −50.0000 | 0.2500 | 1.67 | 20.4 | −4.89 | −90.0000 |
| S4 | aspheric | 3.4915 | 0.2268 | | | | 34.8790 |
| S5 | aspheric | −0.8589 | 0.4190 | 1.55 | 56.1 | 1.14 | −1.8115 |

TABLE 9-continued

| surface number | surface type | radius of curvature | thickness/ distance | material refractive index | abbe number | focal length | conic coefficient |
|---|---|---|---|---|---|---|---|
| S6 | aspheric | −0.4232 | 0.1227 | | | | −3.5557 |
| S7 | aspheric | −57.0385 | 0.4946 | 1.55 | 56.1 | −1.10 | −46.0464 |
| S8 | aspheric | 0.6087 | 0.4364 | | | | −2.3890 |
| S9 | spherical | infinite | 0.2100 | 1.52 | 64.2 | | |
| S10 | spherical | infinite | 0.4402 | | | | |
| S11 | spherical | infinite | | | | | |

TABLE 10

| surface number | A4 | A6 | A8 | A10 | A12 |
|---|---|---|---|---|---|
| S1 | −2.9963E−04 | −9.0181E−04 | −1.3731E−04 | −2.1023E−05 | −4.4603E−06 |
| S2 | −3.2521E−02 | −1.4990E−03 | −1.7883E−06 | −2.3314E−05 | 3.0967E−06 |
| S3 | −5.1954E−02 | 4.5162E−04 | 7.6924E−04 | 1.1064E−04 | −5.3628E−06 |
| S4 | −3.5345E−02 | 3.3550E−03 | 1.3317E−03 | −5.1485E−04 | −5.9634E−04 |
| S5 | −2.3893E−02 | −9.7702E−03 | −3.6776E−03 | −1.5302E−03 | −4.0875E−04 |
| S6 | −1.1869E−01 | 5.7682E−02 | −9.0105E−03 | −4.5109E−03 | −9.8609E−04 |
| S7 | −4.4922E−02 | −1.0144E−02 | 1.2608E−02 | −1.1030E−02 | 9.2862E−03 |
| S8 | −1.0682E+00 | 1.8779E−01 | −7.7468E−02 | 2.9526E−02 | −8.3178E−03 |

| surface number | A14 | A16 | A18 | A20 |
|---|---|---|---|---|
| S1 | 5.6566E−07 | −3.8030E−07 | −4.8689E−07 | 1.7748E−07 |
| S2 | −2.3091E−06 | 1.2697E−06 | −1.4206E−06 | 6.3942E−07 |
| S3 | 8.9922E−06 | −2.4134E−06 | 3.9441E−06 | −1.6733E−06 |
| S4 | −5.7029E−04 | −4.3238E−04 | −2.5912E−04 | −1.2183E−04 |
| S5 | −1.8222E−04 | −8.5828E−05 | 4.1772E−04 | 7.5616E−04 |
| S6 | 2.0910E−03 | 2.1385E−03 | 2.2627E−03 | 2.0644E−03 |
| S7 | −1.3689E−03 | 4.2524E−03 | 1.1603E−03 | 2.7251E−03 |
| S8 | 1.1610E−02 | 2.5300E−03 | 5.6268E−03 | 3.1202E−03 |

Figure 10A:
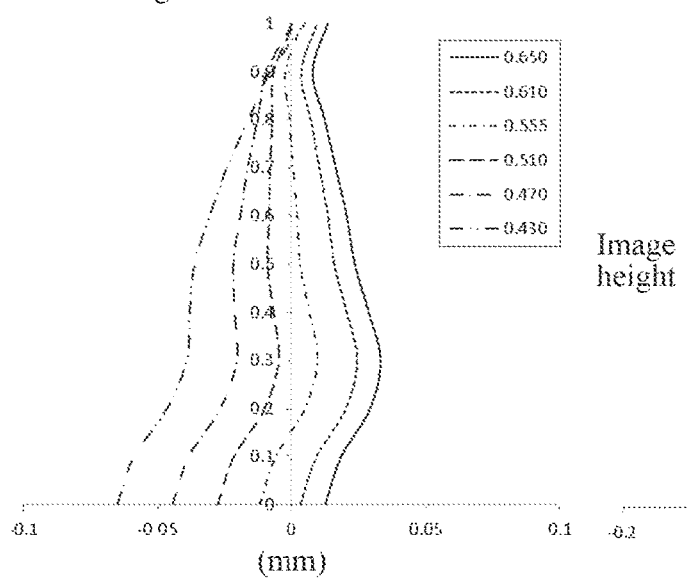
Figure 10B:
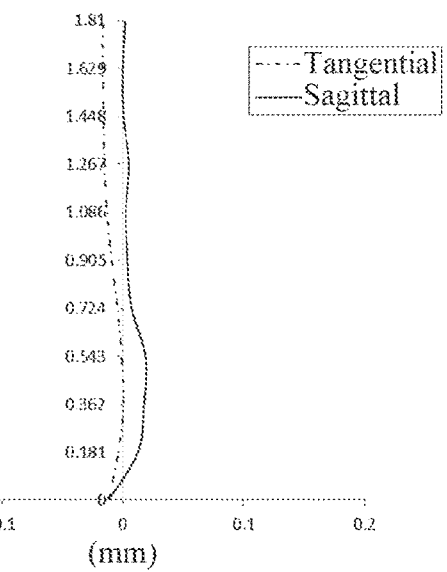

FIG. 10A illustrates a longitudinal aberration curve of the optical lens assembly in Embodiment 5, representing deviations of focal points of light of different wavelengths converged after passing through the optical lens assembly. FIG. 10B illustrates an astigmatic curve of the optical lens assembly in Embodiment 5, representing a curvature of a tangential image plane and a curvature of a sagittal image plane. FIG. 10C illustrates a distortion curve of the optical lens assembly in Embodiment 5, representing amounts of distortion corresponding to different image heights. FIG. 10D illustrates a lateral color curve of the optical lens assembly in Embodiment 5, representing deviations of different image heights on the image plane after light passes through the optical lens assembly. It can be seen from FIGS. 10A-10D that the optical lens assembly given in Embodiment 5 can achieve a good imaging quality.

In summary, Embodiments 1-5 respectively satisfy the relationships shown in Table 11.

TABLE 11

| conditional expression | embodiment | | | | |
| | 1 | 2 | 3 | 4 | 5 |
|---|---|---|---|---|---|
| f4/f | −1.80 | −0.86 | −1.68 | −1.72 | −0.88 |
| R2/R1 | −6.03 | −2.71 | −6.02 | −7.19 | −4.26 |
| f2/f3 | −2.78 | −3.05 | −2.92 | −3.17 | −4.28 |
| f1/CT1 | 3.51 | 3.77 | 3.51 | 3.42 | 3.40 |
| R4/|R5 + R6| | 1.86 | 1.83 | 1.84 | 2.20 | 2.72 |
| T23/T12 | 2.00 | 1.15 | 2.02 | 1.67 | 2.07 |

TABLE 11-continued

| conditional expression | embodiment | | | | |
| | 1 | 2 | 3 | 4 | 5 |
|---|---|---|---|---|---|
| TL/TTL | 1.35 | 1.19 | 1.35 | 1.31 | 1.45 |
| f/R8 | 3.13 | 2.10 | 3.11 | 2.99 | 2.06 |
| ΣCT/CT3 | 3.22 | 3.07 | 3.21 | 3.25 | 3.71 |

The present disclosure further provides a camera apparatus having an electronic photosensitive element which may be a photosensitive charge-coupled device (CCD) or complementary metal-oxide semiconductor element (CMOS). The camera apparatus may be an independent camera device such as a digital camera, or may be a camera module integrated in a mobile electronic device such as a mobile phone. The camera apparatus is equipped with the optical lens assembly described above.

The foregoing is only a description for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combination of the above technical features or equivalent features thereof without departing from the concept of the invention, for example, technical solutions formed by replacing the features as disclosed in the present disclosure with (but not limited to) technical features with similar functions.

What is claimed is:

1. An optical test system, comprising, sequentially along an optical axis:
   a distance extension module, comprising one or more lenses; and
   an optical lens assembly, comprising, sequentially along the optical axis from an object side to an image side:
      a diaphragm;
      a first lens, having a positive refractive power, an object-side surface of the first lens being a convex surface, and an image-side surface of the first lens being a convex surface;
      a second lens, having a negative refractive power, an object-side surface of the second lens being a concave surface, and an image-side surface of the second lens being a concave surface;
      a third lens, having a refractive power, an object-side surface of the third lens being a concave surface, and an image-side surface of the third lens being a convex surface; and
      a fourth lens, having a refractive power;
   wherein the distance extension module converges parallel light to form a point light source used to simulate an object of the optical lens assembly; and $-2.0 < f4/f \leq -1.68$, wherein f4 is an effective focal length of the fourth lens, and f is a total effective focal length of the optical lens assembly,
   wherein $-4.5 < f2/f3 < -2.5$, wherein f2 is an effective focal length of the second lens, and f3 is an effective focal length of the third lens.

2. The optical test system according to claim 1, wherein $1.5 < R4/|R5+R6| < 3.0$,
   wherein R4 is a radius of curvature of the image-side surface of the second lens, R5 is a radius of curvature of the object-side surface of the third lens, and R6 is a radius of curvature of the image-side surface of the third lens.

3. The optical test system according to claim 1, wherein $1.0 < T23/T12 < 2.1$,
   wherein T12 is a spacing distance between the first lens and the second lens along the optical axis, and T23 is a spacing distance between the second lens and the third lens along the optical axis.

4. The optical test system according to claim 1, wherein $1.0 < TL/TTL < 1.5$,
   wherein TL is a spacing distance between an image-side surface of the distance extension module and the diaphragm along the optical axis, and TTL is a distance from the object-side surface of the first lens to an image surface of the optical lens assembly along the optical axis.

5. The optical test system according to claim 1, wherein $2.0 < f/R8 < 3.2$,
   wherein f is the total effective focal length of the optical lens assembly, and R8 is a radius of curvature of an image-side surface of the fourth lens.

6. An optical test system, comprising, sequentially along an optical axis:
   a distance extension module, comprising one or more lenses; and
   an optical lens assembly, comprising, sequentially along the optical axis from an object side to an image side:
      a diaphragm;
      a first lens, having a positive refractive power, an object-side surface of the first lens being a convex surface, and an image-side surface of the first lens being a convex surface;
      a second lens, having a negative refractive power, an object-side surface of the second lens being a concave surface, and an image-side surface of the second lens being a concave surface;
      a third lens, having a refractive power, an object-side surface of the third lens being a concave surface, and an image-side surface of the third lens being a convex surface; and
      a fourth lens, having a refractive power;
   wherein the distance extension module converges parallel light to form a point light source used to simulate an object of the optical lens assembly; and $-2.0 < f4/f < -1.68$, wherein f4 is an effective focal length of the fourth lens, and f is a total effective focal length of the optical lens assembly, wherein $3.0 < f1/CT1 < 4.0$,
   wherein f1 is an effective focal length of the first lens, and CT1 is a center thickness of the first lens along the optical axis.

7. An optical test system, comprising, sequentially along an optical axis:
   a distance extension module, comprising one or more lenses; and
   an optical lens assembly, comprising, sequentially along the optical axis from an object side to an image side:
      a diaphragm;
      a first lens, having a positive refractive power, an object-side surface of the first lens being a convex surface, and an image-side surface of the first lens being a convex surface;
      a second lens, having a negative refractive power, an object-side surface of the second lens being a concave surface, and an image-side surface of the second lens being a concave surface;
      a third lens, having a refractive power, an object-side surface of the third lens being a concave surface, and an image-side surface of the third lens being a convex surface; and
      a fourth lens, having a refractive power;
   wherein the distance extension module converges parallel light to form a point light source used to simulate an object of the optical lens assembly; and $-2.0 < f4/f < -1.68$, wherein f4 is an effective focal length of the fourth lens, and f is a total effective focal length of the optical lens assembly, wherein $-7.5 < R2/R1 < -2.5$,
   wherein R1 is a radius of curvature of the object-side surface of the first lens, and R2 is a radius of curvature of the image-side surface of the first lens.

8. The optical test system according to any one of claims 1, 7 and 2-6, wherein $3.0 < \Sigma CT/CT3 < 4.0$,
   wherein CT3 is a center thickness of the third lens along the optical axis, and $\Sigma CT$ is a sum of respective center thicknesses of the first lens to the fourth lens along the optical axis.

* * * * *